US007802445B2

(12) United States Patent
Winters

(10) Patent No.: US 7,802,445 B2
(45) Date of Patent: Sep. 28, 2010

(54) INSULATED AND REFRIGERATED BEVERAGE TRANSPORT LINE

(75) Inventor: Kevin Winters, Golden, CO (US)

(73) Assignee: Millercoors, LLC, Chicago, IL (US)

(*) Notice: Subject to any disclaimer, the term of this patent is extended or adjusted under 35 U.S.C. 154(b) by 264 days.

(21) Appl. No.: 11/741,586

(22) Filed: Apr. 27, 2007

(65) Prior Publication Data

US 2008/0264093 A1 Oct. 30, 2008

(51) Int. Cl.
*F25D 3/00* (2006.01)
*F16L 9/18* (2006.01)

(52) U.S. Cl. ......................... 62/393; 138/111; 138/112; 138/113; 138/114; 138/116

(58) Field of Classification Search .................. 62/393; 138/111–117
See application file for complete search history.

(56) References Cited

U.S. PATENT DOCUMENTS

| | | | | |
|---|---|---|---|---|
| 2,771,752 | A * | 11/1956 | Tennant | 62/224 |
| 3,269,422 | A | 8/1966 | Matthews et al. | |
| 3,315,703 | A | 4/1967 | Matthews et al. | |
| 4,094,445 | A | 6/1978 | Bevan | |
| 4,194,536 | A | 3/1980 | Stine et al. | |
| 4,949,552 | A | 8/1990 | Adams | |
| 5,094,088 | A | 3/1992 | Davis | |
| 5,732,856 | A | 3/1998 | Fry | |
| 6,472,614 | B1 * | 10/2002 | Dupont et al. | 174/70 S |
| 6,719,018 | B2 * | 4/2004 | Colombo et al. | 141/91 |
| 7,013,668 | B2 | 3/2006 | Kyees | |
| 7,191,614 | B2 | 3/2007 | Hess et al. | |
| 2006/0032545 | A1 | 2/2006 | Beckett | |
| 2006/0137383 | A1 | 6/2006 | Chiusolo | |
| 2006/0162370 | A1 * | 7/2006 | Haskayne | 62/390 |
| 2006/0168987 | A1 | 8/2006 | Kyees | |

FOREIGN PATENT DOCUMENTS

| | | |
|---|---|---|
| EP | 1698587 | 9/2006 |
| GB | 2417057 | 2/2006 |
| GB | 2423811 | 9/2006 |
| WO | 90/00517 | 1/1990 |

* cited by examiner

*Primary Examiner*—Frantz F Jules
*Assistant Examiner*—Cassey Bauer
(74) *Attorney, Agent, or Firm*—Sheridan Ross PC

(57) ABSTRACT

An insulated and refrigerated beverage transport line provides enhanced temperature control of one or more beverages conveyed through the transport line. A plurality of coolant lines carrying a re-circulated coolant makes contact with the one or more product lines. One or more empty lines, referred to as packers, may be placed between the coolant lines and the product lines to provide a dimensionally stable and tight group of lines that are bundled together. An external insulation is provided over the bundle of lines to further enhance insulation for the beverage being transported through the product lines. At least one dedicated coolant return line may be placed remote from the other lines. The dedicated coolant return line carries the highest temperature coolant found in a beverage transport system. Independent and separate insulation of this dedicated coolant return line prevents inadvertent heat transfer to the one or more product lines.

4 Claims, 2 Drawing Sheets

INSULATED AND REFRIGERATED BEVERAGE TRANSPORT LINE

FIELD OF THE INVENTION

The present invention relates to a beverage storage and transport system, and more particularly, to an insulated and refrigerated beverage transport line used to transport one or more beverages and wherein the beverages are maintained at a desired temperature during transport.

BACKGROUND OF THE INVENTION

It is customary for beverages such a beer to be chilled before being served. Beer is most often provided to establishments in large containers such as beer kegs. Typically, the kegs are stored in a refrigerator that may be located a substantial distance from the point where the beverage is to be dispensed. A pressurized transport line or trunk is used to transport the beer from the storage area to the dispense point. Depending upon the storage conditions for the beverage as well as the length and type of transport line used, the beer will warm and therefore, could be dispensed at an undesirable temperature.

Attempts have been made to resolve the warming of a beverage as it is transported. One solution is to provide some type of insulation around the beverage transport line to include running a dedicated cooling line within the insulation and along the transport line. The dedicated cooling line receives a supply of continuously circulated cooling liquid, most commonly glycol. The glycol is stored at a remote location, and is refrigerated to provide the continuously circulated cooling capability. Examples of references that disclose refrigerated or cooled beverage transport lines include the U.S. Pat. Nos. 4,094,445, 5,732,856, and 4,949,552. The '445 reference specifically discloses a refrigerated supply line for supplying beverages to a multi-tap dispenser. The '856 reference discloses a beverage conveyance system wherein the coolant is re-circulated on a continuous basis and has a cooling line in contact with the beverage conveying line to cool the transported beverage. A bladder type pressure tank pressurizes the coolant. The conveyance system is closed and pressurized, thereby minimizing separation and evaporation of the coolant and preventing contamination of the coolant. The '552 reference discloses a beverage transport line in contact with a coolant line filled with a coolant such as glycol.

While there may be a number of prior art devices and systems for delivering a cooled beverage to a dispense point, a number of these devices and systems are still incapable of adequately cooling the beverage to be dispensed, particularly when the devices/systems are incorporated in an establishment where the beverage is stored at a considerable distance from the dispense point. With respect to beer, it is desirable to maintain the temperature of the beer close to its freezing temperature enabling the beer to be dispensed from the tap without the creation of excessive foam. Also, depending upon the brand of beer being served at the establishment, some beers are preferably provided to the customer at such near freezing temperatures in order to maximize the advertised characteristics of the beer.

Despite the number of devices and systems for cooling a beverage, there is still a need for a device and system capable of transporting a beverage to a dispense point such that the beverage is maintained at a near freezing temperature. There is also a need for a device/system to deliver the beverage that is structurally stable for long-term use, is economical to manufacture, and is easy to install.

SUMMARY OF THE INVENTION

In accordance with an apparatus of the present invention, an insulated and refrigerated beverage transport line or "python" is provided for transporting a beverage such as beer from a storage location to a dispense point. In another aspect of the invention, a beverage storage and transport system is provided that incorporates the insulated and refrigerated beverage transport line. In yet another aspect of the invention, a method is provided for transporting a beverage and maintaining the beverage at a desired temperature during transport.

In accordance with the apparatus of the present invention, the transport line is characterized by a plurality of bundled tubes or lines housed within an insulation material. Each of these separate lines has a function as discussed below. A dedicated return line is spaced from and separately insulated from the rest of the bundled lines. More specifically, the plurality of bundled tubes or lines include at least one product or beverage line carrying the beverage to be dispensed, surrounded by a plurality of cooling lines that carry a coolant such as glycol. In order to structurally stabilize the bundle of lines, a plurality of empty lines are provided to fill the gaps between the coolant lines and the product line(s). These empty lines are referred to herein as packers. The product line(s), cooling lines, and packers are bundled together and wrapped with an internal layer of supporting material such as aluminum foil. A relatively thick wall of insulation then surrounds the bundled lines. The dedicated external return line is placed externally of the wall of insulation and includes its own wall or layer of insulation. The transport line therefore forms a composite group of lines having an irregular shaped cross-section. A barrier film may be used to join the dedicated return line to the insulation housing the bundled lines.

According to the system of the present invention, a coolant reservoir provides a supply of coolant that is continually circulated through the coolant lines. The coolant reservoir is preferably refrigerated by its own refrigeration unit. Stored beverages, such as beer, are preferably housed within a cooler such as a walk-in refrigerator. A primary heat exchanger is located downstream of the stored beverage(s) and provides a "boost" of cooling to the beverage(s) prior to being dispensed. In the system, a preferred embodiment of the present invention provides a specific recirculation pattern for the coolant that optimizes cooling of the beverage(s). One coolant line in the bundle originates at the coolant reservoir and extends through the transport line directly to the dispense point. This coolant line then returns back through the transport line and terminates at the coolant reservoir. Another coolant line in the bundle originates at the coolant reservoir and provides a supply of coolant to the primary heat exchanger. This coolant line terminates at the primary heat exchanger, but the heated coolant from the primary heat exchanger is returned to the coolant reservoir through the external dedicated return line.

The transport line of the present invention is suitable for installation within current beverage transport systems, yet the construction of the transport line provides enhanced benefits with respect to maintaining beverages at desired temperatures. The robust construction of the transport line including the use of one or more packers ensures that the transport line can be a permanent solution for transport of one or more beverages.

Other features and advantages of the present inventions will become apparent from a review of the following detailed description, taken in conjunction with the drawings.

DETAILED DESCRIPTION

Figure 1:
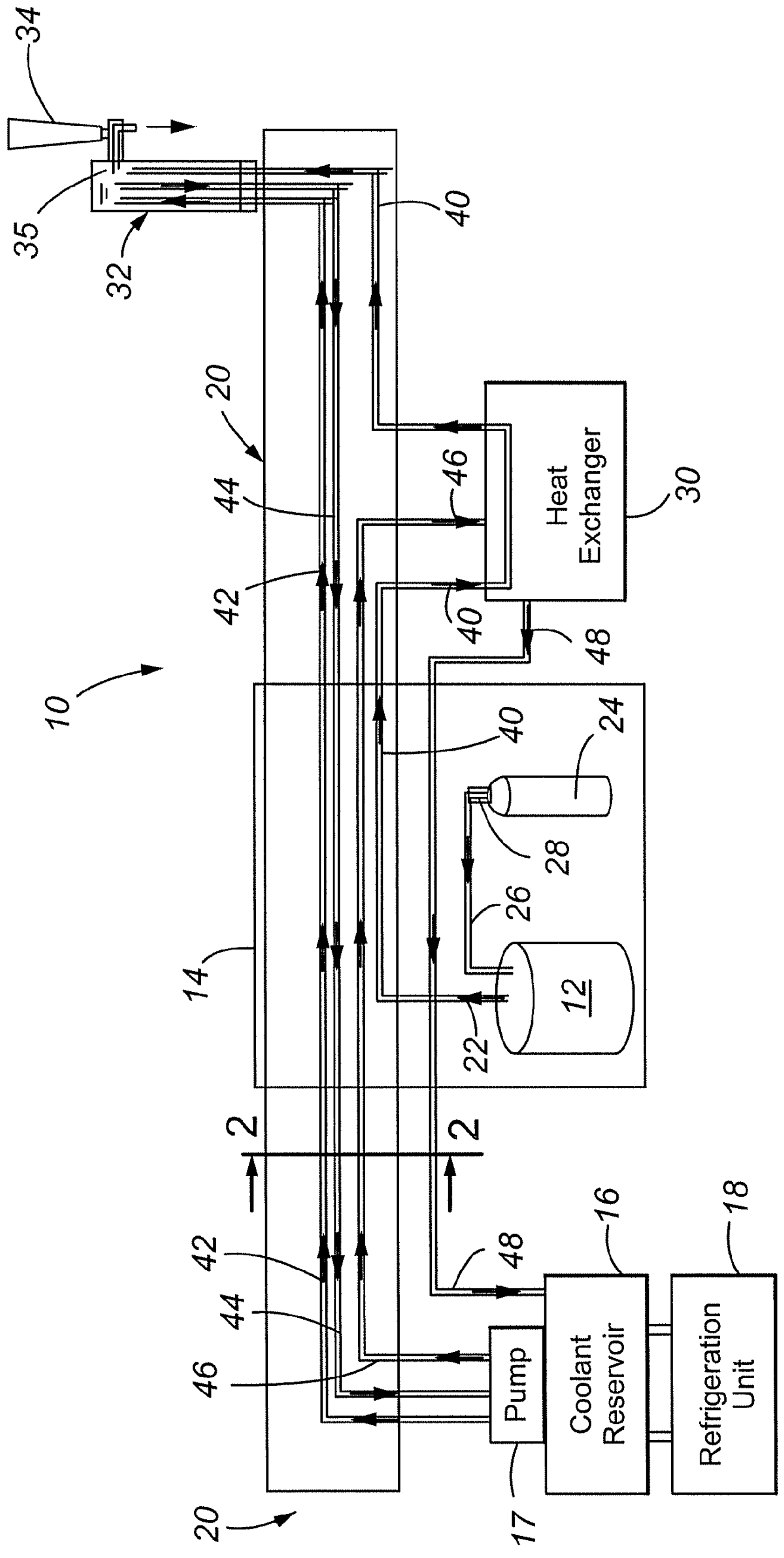
FIG. 1 illustrates a schematic view of a beverage storage and transport system of the present invention including a beverage transport line of the present invention.

FIG. 1 is a schematic drawing of the beverage storage and transport system 10 of the present invention. The system includes at least one beverage storage container 12, such as a beer keg. The storage container is typically stored in a refrigerated area, illustrated in the preferred embodiment as a walk-in refrigerator 14. A coolant reservoir 16 provides a continuous supply of coolant such as glycol, through a beverage transport line 20. A pump 17 is used to force the coolant through the transport line 20. A refrigeration unit 18 may be provided to cool the reservoir of coolant 16. An intermediate connecting line 22 connects to transport line 20 to enable the beverage within the storage container 12 to be transferred to the beverage transport line 20. Necessary fittings and/or couplings may be used to attach the connecting line 22 to the transport line 20. The beverage to be conveyed through the transport line 20 is pressurized as by a conventional compressed air supply 24, shown as a gas cylinder. A regulator 28 regulates the amount of pressurization provided through pressurization line 26. Although only one beverage container is shown, it will be appreciated that additional beverage containers can be used and which connect to the transport line, either in a parallel or series relationship by use of additional connecting lines 22, depending upon the type of beverages to be transported.

As shown, the transport line 20 extends from the coolant reservoir 16 all the way to the dispense point, shown as a single dispense font 32. Downstream of the walk-in refrigerator 14 is a heat exchanger 30 which boosts the cooling supplied to the beverage prior to being delivered to the dispense font 32. The heat exchanger 30 may be a conventional cold plate heat exchanger. A cold plate heat exchanger typically includes a traversing pattern of coolant lines that pass in close proximity to or in contact with the beverage supply line(s). The coolant lines and beverage line(s) may also be in contact with one or more metallic plates within the heat exchanger. These plates also enhance heat transfer away from the transported beverage(s).

As also shown in the schematic drawing of FIG. 1, the dispense font 32 has a tap 34 that enables controlled dispensing of the beverage from the dispense font. The dispense font 32 may include a hollow interior or cavity 35 that receives one or more coolant lines. A small beverage reservoir (not shown) may be contained within the hollow interior 35 of the dispense font 32. The coolant lines traversing through the interior of the dispense font can therefore cool the reservoir containing the beverage.

Figure 2:
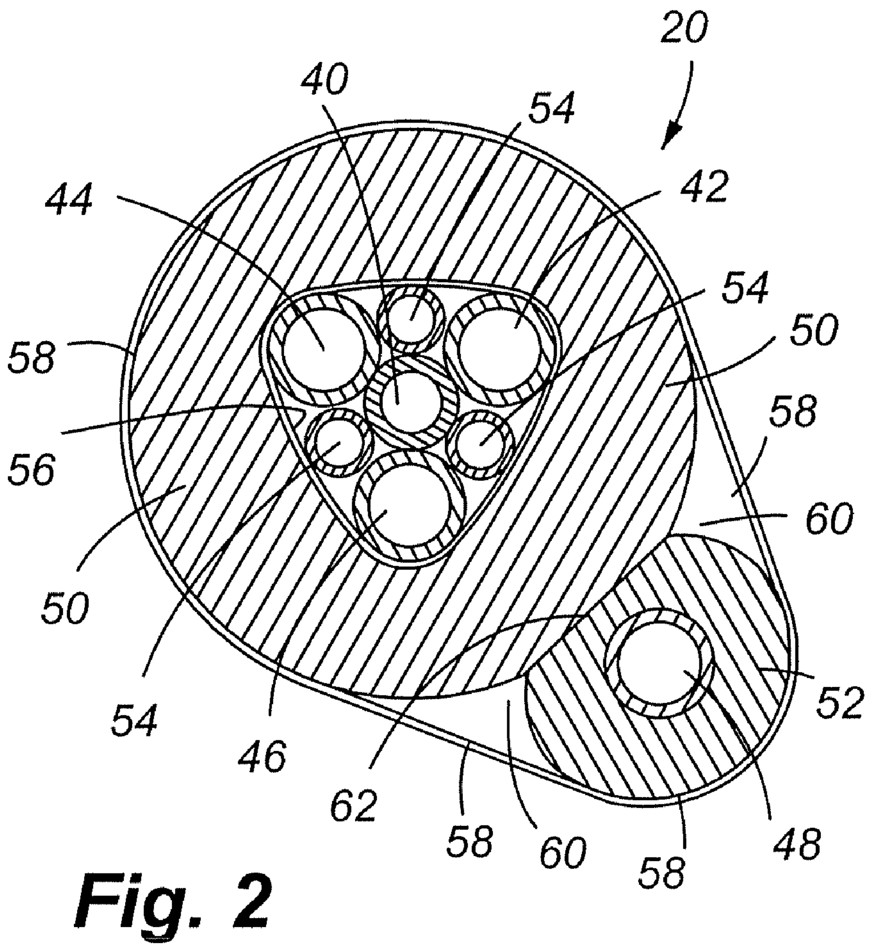
FIG. 2 is a cross-section taken along line 2-2 of the transport line illustrated in FIG. 1 illustrating the internal details of the transport line.

Referring also to FIG. 2, the specific construction of the transport line in accordance with a preferred embodiment of the present invention is illustrated. One product or beverage line 40 is shown and surrounded by three recirculating coolant lines 42, 44 and 46. The gaps or spaces between the three coolant lines are filled with packers 54. Thus, the cross section as shown in this figure results in a bundle of lines having a generally triangular configuration. In the specific configuration of FIG. 2, the product line 40 maintains contact with at least some portion of each of the recirculating coolant lines 42, 44 and 46. Additionally, the packers also make contact with the coolant lines and the product line. By maintaining each of the lines in a tight group or bundle, the maximum amount of heat transfer is achieved through conduction wherein the beverage within product line 40 is continually cooled by the recirculating coolant in the coolant lines.

In the manufacture of the transport line, it may be desirable to initially secure the bundle of lines with a layer of material such as aluminum foil, this layer being shown as layer 56. An external layer of insulation 50 is then provided around the layer 56. FIG. 2 also shows the dedicated external return line 48 having its own layer of insulation 52. A barrier film 58, such as a PVC tape, is used to join the two groups of insulation 50 and 52. Accordingly, there may be some gap 60 that exists between the two groups of insulation. FIG. 2 shows that there is some amount of compression between the two groups of insulation along contact line or contact area 62. Depending upon space constraints, the number of cooling lines within the bundle, and other factors, the insulation may be more tightly or loosely wrapped with the barrier film to appropriately size the cross sectional area of the transport line.

FIG. 2 also illustrates general size relationships between the diameters of the coolant lines, product line and packers. However, it shall be understood that the particular diameters of each may be adjusted to optimize the bundled arrangement of the coolant lines to fit within the provided insulation. Also, the number of product lines and coolant lines can be varied to best serve the needs of the establishment in which the transport line is installed. For example, in an establishment that serves both alcoholic and non-alcoholic beverages at the same dispense point, it may be desirable to transport the alcoholic beverage such as beer within the most interior line, which in the example of FIG. 2, is product line 40. However, the non-alcoholic beverage could be transported through one of the packers 54, thereby converting the use of the packer into a product line. Although the beverage in the packer would only make contact with two of the coolant lines, adequate cooling can still be provided for this beverage.

Further for example, in an establishment that serves multiple alcoholic or non-alcoholic beverages, and wherein multiple beverages are stored at the same location, it may be desirable to provide additional product lines surrounded by additional packers as well as one or more additional coolant lines. One additional specific example could include two product lines placed in contact with one another and surrounded by three or four packers, and the same configuration of coolant lines shown in FIG. 2. In this additional example, the overall diameter of the transport line would increase by the additional packer(s) and product line, assuming the same sized lines were used.

One preferred type of insulation material that may be used for insulation groups 50 and 52 includes an insulation material known as Valwrap®, sold by Valpar of Northern Ireland. The barrier film 58 may be made of a food quality tape such as black PVC tape. For the product line(s), packers, and coolant lines, food grade quality plastic tubing can be used.

Referring back to FIG. 1, the method of the present invention is now described with respect to the manner in which coolant is circulated through the system. In FIG. 1, directional arrows are provided for detailing the direction of coolant flow and the beverage through the transport line. Line 42 is shown as an outgoing coolant line originating at the coolant reservoir 16 and extending through the dispense font 32. The coolant is then re-circulated back through return line 44. Thus, return line 44 can be described as simply an extension of line 42 but directed in the opposite direction. Line 44 terminates back at the coolant reservoir 16. At the location of the dispense font 32, coolant line 42 may either terminate and connect to another coolant coil or line within the dispense font (not shown), or the coolant line 42 may be truly continuous through the dispense font as shown, and is then routed back through the transport line 20 as return line 44. Coolant line 46 is illustrated as originating from the coolant reservoir 16, and extending through the transport line 20 to deliver coolant to the heat exchanger 30. Coolant fluid is then returned from the heat exchanger 30 through the exterior dedicated return line 48 to the coolant reservoir 16. Accordingly, the return line 48 originates at some point adjacent the heat exchanger 30 and extends back to the coolant reservoir 16. With respect to the packers 54, depending upon the type of material used for the packers and the need for a more flexible or stiff transport line, the packers 54 could extend all the way to the dispense font 32, or could terminate at some location between the dispense font 32 and the heat exchanger 30. It is noted that the highest temperature coolant is typically found in the return line 48; therefore, isolating this return line from the other coolant lines provides some additional benefits in maintaining the beverage to be transported at a near freezing temperature.

There are many advantages of the transport line and system of the present invention. A tightly configured bundle of lines may be provided to transport one or more beverages wherein continuously circulating coolant within integral cooling lines provides enhanced cooling capability. The remote placement of the dedicated coolant return line ensures that heated coolant is not inadvertently placed in contact with beverage lines. The packers provide additional strength to the construction of the transport line, and if desired, one or more of the packers can be designated as a product line for transporting an additional beverage.

Although the apparatus, system and method of the present invention are set forth above in one or more preferred embodiments, it shall be understood that various changes and modifications may be made to the invention commensurate with the scope of the claims appended hereto.

What is claimed is:

1. A beverage transport system comprising:

a product line;

a plurality of packers, each comprising tubes, extending with said product line and contacting said product line;

at least three coolant lines extending along said packers and said product line, said at least three coolant lines contacting at least one of said packers and said product line;

a first layer of insulation housing said product line, said packers, and said at least three coolant lines;

a dedicated coolant return line;

a second layer of insulation surrounding said dedicated coolant return line, said second layer of insulation not enclosing said product line, said packers and said at least three coolant lines;

a coolant reservoir providing a supply of coolant through said at least three coolant lines and said dedicated coolant return line;

a refrigeration unit communicating with said coolant reservoir to cool coolant in said reservoir;

a beverage supply providing a supply of beverage through said product line;

a cooler for storing said beverage supply;

a heat exchanger communicating with one coolant line of said at least three coolant lines, wherein coolant heated within said one coolant line at said heat exchanger is returned to said coolant reservoir by said dedicated coolant return line; and a dispense font communicating with said transport line for receiving the supply of beverage and for dispensing the beverage.

2. A system, as claimed in claim 1, wherein:

said at least three coolant lines each contact said product line and are spaced about a circumference of said product line, and said plurality of packers being placed between said at least three coolant lines.

3. A beverage transport system comprising:

a product line;

a plurality of packers, each comprising tubes, extending with said product line and contacting said product line;

at least three coolant lines extending along said packers and said product line, said at least three coolant lines contacting at least one of said packers and said product line;

a first layer of insulation housing said product line, said packers, and said at least three coolant lines;

a dedicated coolant return line;

a second layer of insulation surrounding said dedicated coolant return line, said second layer of insulation not enclosing said product line, said packers and said at least three coolant lines;

a coolant reservoir providing a supply of coolant through said at least three coolant lines and said dedicated coolant return line;

a refrigeration unit communicating with said coolant reservoir to cool coolant in said reservoir;

a beverage supply providing a supply of beverage through said product line;

a cooler for storing said beverage supply;

a heat exchanger communicating with one coolant line of said at least three coolant lines, wherein coolant heated within said one coolant line at said heat exchanger is returned to said coolant reservoir by said dedicated coolant return line;

a dispense font communicating with said transport line for receiving the supply of beverage and for dispensing the beverage; and said at least three coolant lines include, a first coolant line circulating coolant from said coolant reservoir to said dispense font, a second coolant line circulating coolant from said dispense font back to said coolant reservoir, and a third coolant line circulating coolant from said coolant reservoir to said heat exchanger.

4. A method of cooling a beverage as it is transported from a storage area to a dispense point, said method comprising the steps of:

providing at least one product line;

providing at least one packer extending with said at least one product line and contacting said at least one product line;

providing of at least three coolant lines extending along said at least one packer and said at least one product line, said at least three coolant lines contacting at least one of said at least one packer and said at least one product line;

providing a first layer of insulation housing said at least one product line, said at least one packer, and said at least three coolant lines;

providing a dedicated coolant return line;

providing a second layer of insulation surrounding said dedicated coolant return line;

providing a flow of coolant through a first coolant line of said at least three coolant lines from a coolant reservoir to the dispense point in a first direction;

providing a flow of coolant through a second coolant line of said at least three coolant lines from the dispense font back to the coolant reservoir in a second opposite direction;

providing a flow of coolant through a third coolant line of said at least three coolant lines from the coolant reservoir to a heat exchanger in the first direction;

providing a flow of coolant from the heat exchanger through the dedicated return line back to the coolant reservoir in the second direction;

providing a flow of the beverage through said at least one product line from a beverage supply to the dispense point; and cooling the beverage in the product line.

* * * * *